T. J. MELL.
TIRE FOR VEHICLE WHEELS.
APPLICATION FILED MAY 25, 1908.
898,907.
Patented Sept. 15, 1908.
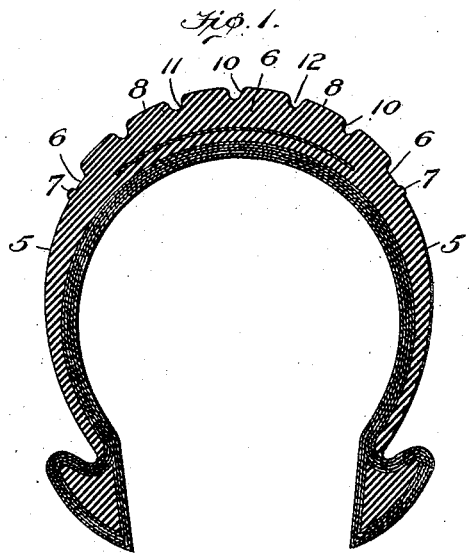
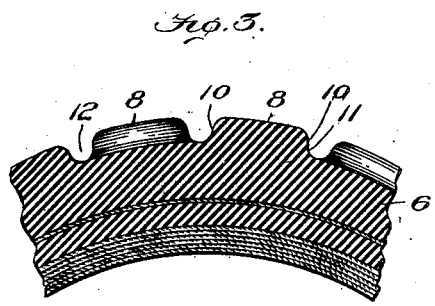
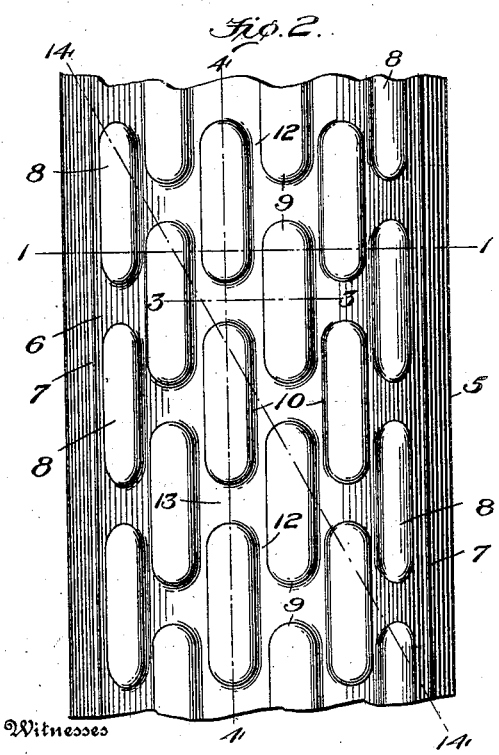
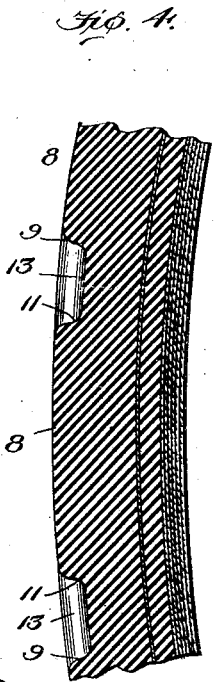

UNITED STATES PATENT OFFICE.

TOD J. MELL, OF YOUNGSTOWN, OHIO, ASSIGNOR TO THE REPUBLIC RUBBER COMPANY, OF YOUNGSTOWN, OHIO, A CORPORATION OF OHIO.

TIRE FOR VEHICLE-WHEELS.

No. 898,907.  Specification of Letters Patent.  Patented Sept. 15, 1908.

Application filed May 25, 1908. Serial No. 434,915.

*To all whom it may concern:*

Be it known that I, TOD J. MELL, a citizen of the United States, residing at Youngstown, in the county of Mahoning and State of Ohio, have invented certain new and useful Improvements in Tires for Vehicle-Wheels; and I do hereby declare the following to be a full, clear, and exact description of the invention, such as will enable others skilled in the art to which it appertains to make and use the same.

My invention relates to vehicle wheels, but more particularly to tires for such wheels, and with still greater particularity to the outer cover or protective casing for such tires.

It is designed especially for use in connection with tires of the pneumatic type employing inner inflatable tubes, but is none the less efficient as a single tube structure, or when used in conjunction with cushion or solid tires; the invention residing primarily in certain novel features of construction relating to the outer or tread-surface and is equally applicable to all forms of resilient tires.

This invention has among its objects the production of tires having superior traction or road gripping qualities; tires that reduce to a minimum all side "skidding" tendencies under varying loads and road conditions; and tires that are rendered peculiarly durable and puncture proof in manner and form, as will hereinafter appear.

The objects above stated and others, are obtainable as direct results of the novel construction and arrangement of tread-surface which characterizes the present invention and forms the subject-matter of the present application for Letters Patent.

This invention will now be particularly described and pointed out in the claims following.

In the accompanying drawings which form part of this application, and whereon like characters of reference indicate corresponding parts in the several views: Figure 1 represents a transverse sectional view of a tire-cover or casing embodying my invention, taken on the line 1—1 of Fig. 2. Fig. 2 is a fragmentary plan view of my invention showing a portion of the tire tread-surface. Fig. 3 is an enlarged transverse sectional view on the line 3—3 of Fig. 2, and, Fig. 4 is a longitudinal section, also enlarged, taken on the line 4—4 of Fig. 2.

Reference being had to the drawings and numerals thereon, 5 indicates the body of my resilient tire-cover or casing, having its peripheral tread-surface 6, bounded on either side by circumferential beads 7, 7, surrounding the structure. The tread-surface 6 is configured by a multiplicity of elongated projecting studs 8, which like said beads 7, are preferably molded integral with the body 5, and are arranged longitudinally with relation to the circumference or length of the tire, and parallel with relation to each other as will hereinafter more fully appear. These studs 8 are counterparts one of the other, and are, individually considered, of substantially rectangular or elongated outline, they are preferably flattened upon their outer surfaces as shown, and are formed with full rounded ends 9, which like the sides 10 are widened at the base and are joined to the surface 6 by a heavy fillet 11 which latter accordingly surrounds and reinforces each of said studs.

In circumferential arrangement the studs 8 collectively considered extend around the entire surface 6 in endless succession, and in parallel rows or series, those of each series overlapping or breaking joints with those of the adjacent series; while in transverse arrangement they cross the tread-surface in zig zag form from one bead 7 to the other, as clearly shown by Fig. 2. By this arrangement also, it will be noted that the spaces 12 between adjacent studs 8, as also spaces 13 at the ends thereof are of outwardly diverging form the better to clear the structure from mud and foreign matter that might otherwise accumulate and be compressed between said studs, thereby impairing their usefulness as anti-skid contrivances. Moreover, the divergence referred to necessarily results in a corresponding outward convergence of the studs themselves as may be seen by reference to Figs. 3—4, and for purposes that will later appear. This being a description of my invention in its preferred form and arrangement, its use when applied to vehicle wheels, as for example those of an automobile, is that ordinarily imposed upon vehicle tires, and need not therefore be dwelt upon. The practical operation, however, should be briefly referred to.

When running upon a straight course and firm road, it will be noted that my improved tires reduce to a minimum the frictional resistance at points of contact with the road, the load in the meantime being carried by two or more of the circumferential series of studs 8 upon each tire, which are so spaced and arranged as to prevent any unusual vibration. The studs 8 which are thus momentarily subjected to more or less compression radially, are flattened somewhat upon their relatively narrow outer surfaces, but owing to their increased width of base and the reinforcing fillets 11, are not seriously distorted. Said fillets on the contrary are by such compression enabled to more effectually resist punctures at points between studs 8, there being no angle to receive or pick up nails, wire, or other injurious substances from the road bed. If, on the other hand, the road bed is not firm, obviously the studs 8 will be submerged as they successively contact with the surface, but under these circumstances the weight of the load is sustained by the greater surface of the entire tread 6 between beads 7—7, as with ordinary tires; and owing to their outward divergence the spaces 12 and 13 more readily clear themselves of mud, snow, or other foreign matter. When, however, running under either good or bad road conditions, wet or dry roads, it becomes necessary to speedily turn one way or the other, the disastrous results of "skidding" so frequent with ordinary tires, is practically overcome in the present invention.

It is well understood that during the skidding action referred to, the line of movement is a compromise between the direction of travel and that of the side force applied. That is to say, the tires must resist this force in a diagonal direction as indicated by the dotted line 14—14 on Fig. 2 of the drawings; and to this end said studs 8 in addition to the transverse zig zag arrangement heretofore mentioned, are staggered diagonally across the tread-surface 6 in echelon formation as indicated by said line 14—14. The line of resistance therefore being as generally indicated, studs 8 receive the first and greatest impact diagonally upon their advance or leading ends to counteract skidding tendencies, and, owing to the elongated form of said studs, their length which exceeds their width, their width which is greater than their thickness, their full rounded ends and relatively wide filleted base, a structural stability is obtained which holds satisfactorily against the side strains to which the studs are frequently subjected. And it will be particularly noted as a further result of said structural arrangement that the comparatively flat outer or contacting surfaces of studs 8, when under compression, are prevented from folding over and thereby trapping sand or grit at the base thereof, which otherwise would shortly cut out and destroy all usefulness of the studs. And while, as stated, the spaces 12 and 13 at sides and ends respectively, of studs 8 diverge outwardly, it follows that the studs themselves are of outwardly converging form, and as a consequence have inwardly diverging walls; that is to say, the individual studs gradually increase in width and length as they approach the tread-surface 6 to which they are joined by fillets 11.

Having thus described my invention, its use and operation, what I now claim and desire to secure by Letters Patent is:

1. A tire for vehicle wheels provided with outwardly projecting circumferentially arranged elongated studs each having inwardly diverging walls, a flat outer surface, and a relatively large base, substantially as described.

2. A tire for vehicle wheels provided with outwardly projecting elongated studs having inwardly diverging walls arranged in parallel circumferential series the studs of one series overlapping those of adjacent series, substantially as described.

3. In a tire for vehicle wheels, the combination with a tread-surface, of a multiplicity of elongated surface studs each having inwardly diverging walls said studs being staggered across the tread-surface in a succession of parallel transverse series, substantially as described.

In testimony whereof I affix my signature, in presence of two subscribing witnesses.

TOD J. MELL.

Witnesses:
J. W. BLACKBURN,
R. M. ARNOLD.

898,907.—*Tod J. Mell*, Youngstown, Ohio. TIRE FOR VEHICLE-WHEELS. Patent dated September 15, 1908. Disclaimer filed January 28, 1914, by the assignee, *The Republic Rubber Company*.

Enters this disclaimer—

"To that part of the claim in said specification which is in the following words, to wit:

"1. A tire for vehicle wheels provided with outwardly projecting circumferentially arranged elongated studs each having inwardly diverging walls, a flat outer surface, and a relatively large base, substantially as described."

[*Official Gazette, February 3, 1914.*]